(12) United States Patent
Nakamura et al.

(10) Patent No.: US 12,371,175 B2
(45) Date of Patent: Jul. 29, 2025

(54) PARACHUTE, SAFETY DEVICE, AND FLIGHT VEHICLE PROVIDED WITH SAFETY DEVICE

(71) Applicant: NIPPON KAYAKU KABUSHIKI KAISHA, Tokyo (JP)

(72) Inventors: Hiroshi Nakamura, Himeji (JP); Kensuke Nishio, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/726,973

(22) PCT Filed: Jan. 11, 2023

(86) PCT No.: PCT/JP2023/000504
§ 371 (c)(1),
(2) Date: Jul. 5, 2024

(87) PCT Pub. No.: WO2023/140159
PCT Pub. Date: Jul. 27, 2023

(65) Prior Publication Data
US 2025/0091720 A1    Mar. 20, 2025

(30) Foreign Application Priority Data
Jan. 21, 2022   (JP) .................................. 2022-008309

(51) Int. Cl.
*B64D 17/80*   (2006.01)
*B64D 17/54*   (2006.01)
(Continued)

(52) U.S. Cl.
CPC ............. *B64D 17/80* (2013.01); *B64D 17/54* (2013.01); *B64D 17/20* (2013.01); *B64D 17/725* (2013.01); *B64U 70/83* (2023.01)

(58) Field of Classification Search
CPC ........ B64D 17/20; B64D 17/54; B64D 17/80; B64D 17/725; B64U 70/83
See application file for complete search history.

(56) References Cited

U.S. PATENT DOCUMENTS 3,655,152 A  *  4/1972  Bonn ................... B64D 17/02
                                                         244/145
4,117,993 A  * 10/1978  Palm ................... B64D 17/12
                                                         244/145

(Continued)

FOREIGN PATENT DOCUMENTS

| JP | 54-49799 A | 4/1979 |
| JP | 2018-193055 A | 12/2018 |
| JP | 2020-185895 A | 11/2020 |

OTHER PUBLICATIONS

International Search Report issued Mar. 14, 2023 in PCT/JP2023/000504 filed Jan. 11, 2023, 2 pages.

*Primary Examiner* — Tye William Abell
(74) *Attorney, Agent, or Firm* — Oblon, McClelland, Maier & Neustadt, L.L.P.

(57) ABSTRACT

A parachute that can be deployed more quickly than before, a safety device provided with the parachute, and a flight vehicle provided with the safety device. An umbrella body of the parachute has a substantially hemispherical shape including a first impact buffer, a second impact buffer, and a shape holder, and includes a vent formed at a top portion and an umbrella edge portion constituting an opening. The first impact buffer and the second impact buffer are formed in a state where each of a plurality of base fabrics is disposed such that a center line L connecting a vertex P and a geometric center position of each of the base fabrics intersects an extending direction of a warp thread and a weft thread of the base fabric.

18 Claims, 8 Drawing Sheets

(51) Int. Cl.
*B64D 17/20* (2006.01)
*B64D 17/72* (2006.01)
*B64U 70/83* (2023.01)

(56) References Cited

U.S. PATENT DOCUMENTS

| | | | | |
|---|---|---|---|---|
| 5,199,669 | A | * | 4/1993 | Vogt .................. F42B 10/56 244/145 |
| 2022/0227495 | A1 | * | 7/2022 | Sakamoto .............. B64U 70/83 |
| 2022/0363399 | A1 | * | 11/2022 | Sakamoto .............. B64U 50/19 |

* cited by examiner

Fig.6
(a)
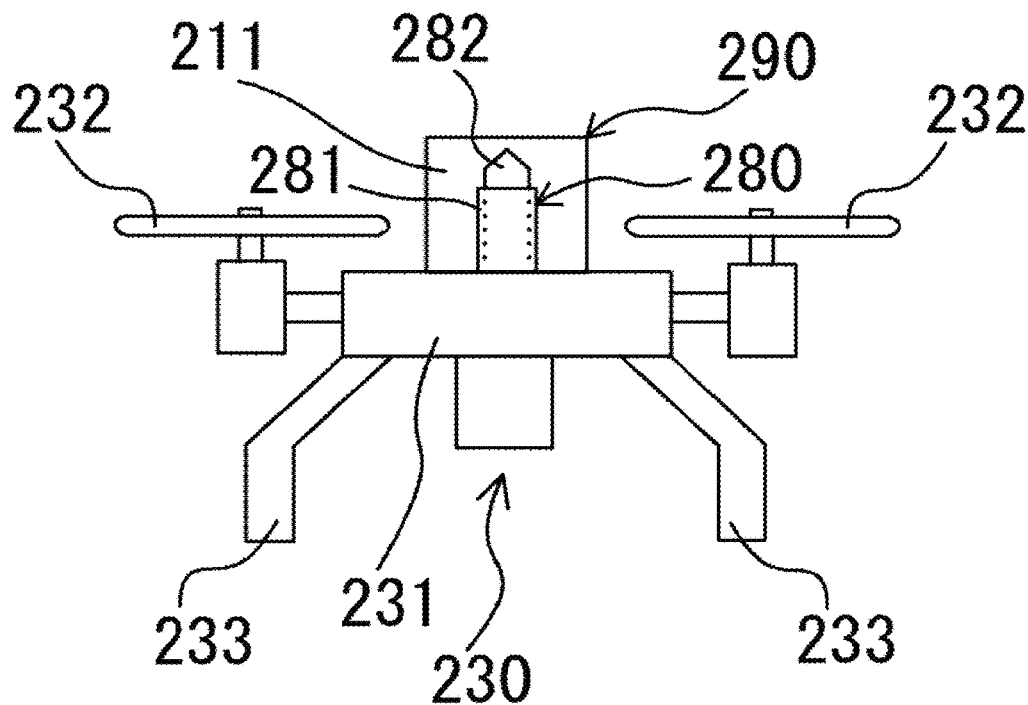
(b)
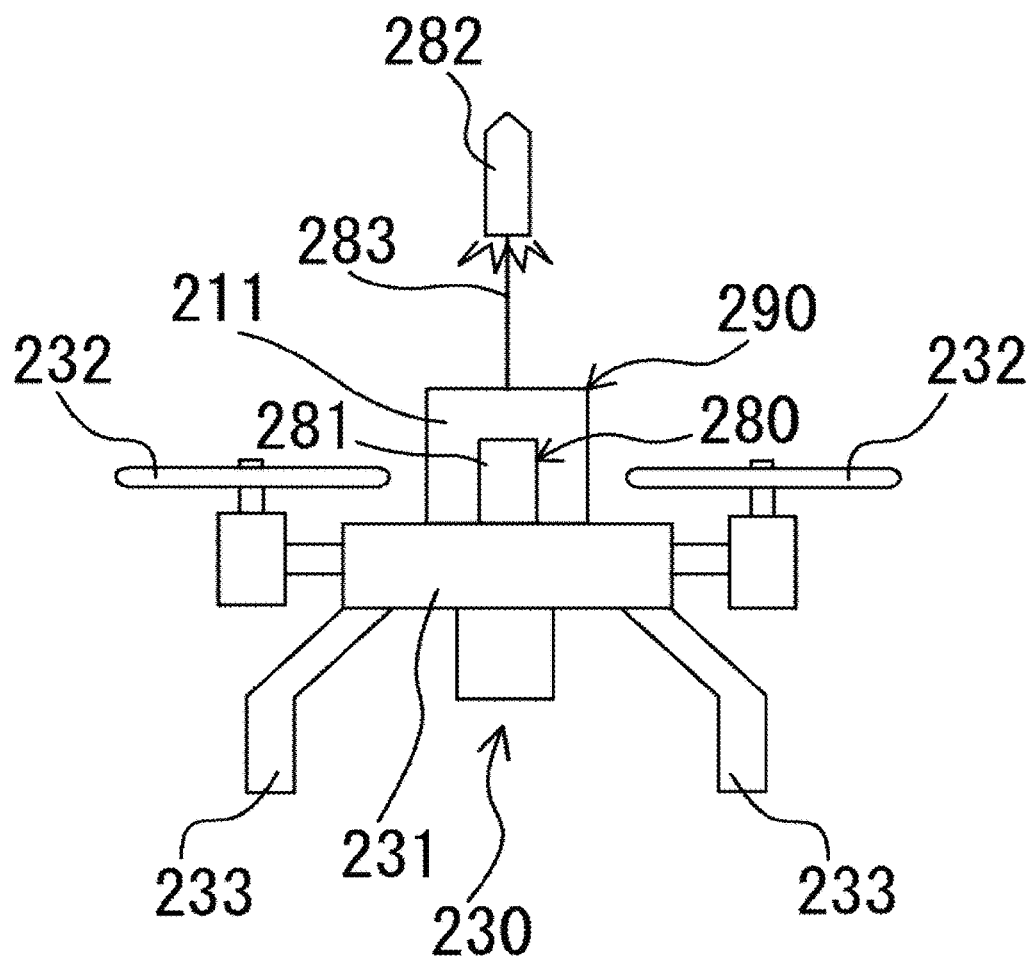

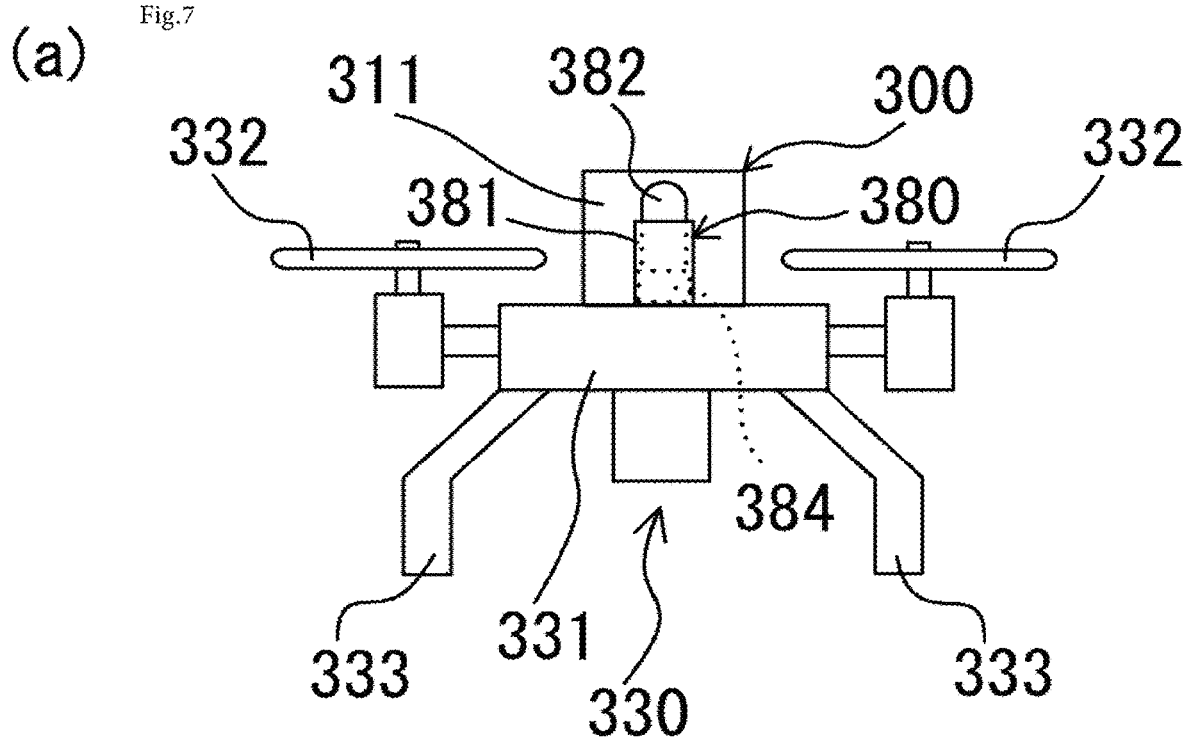
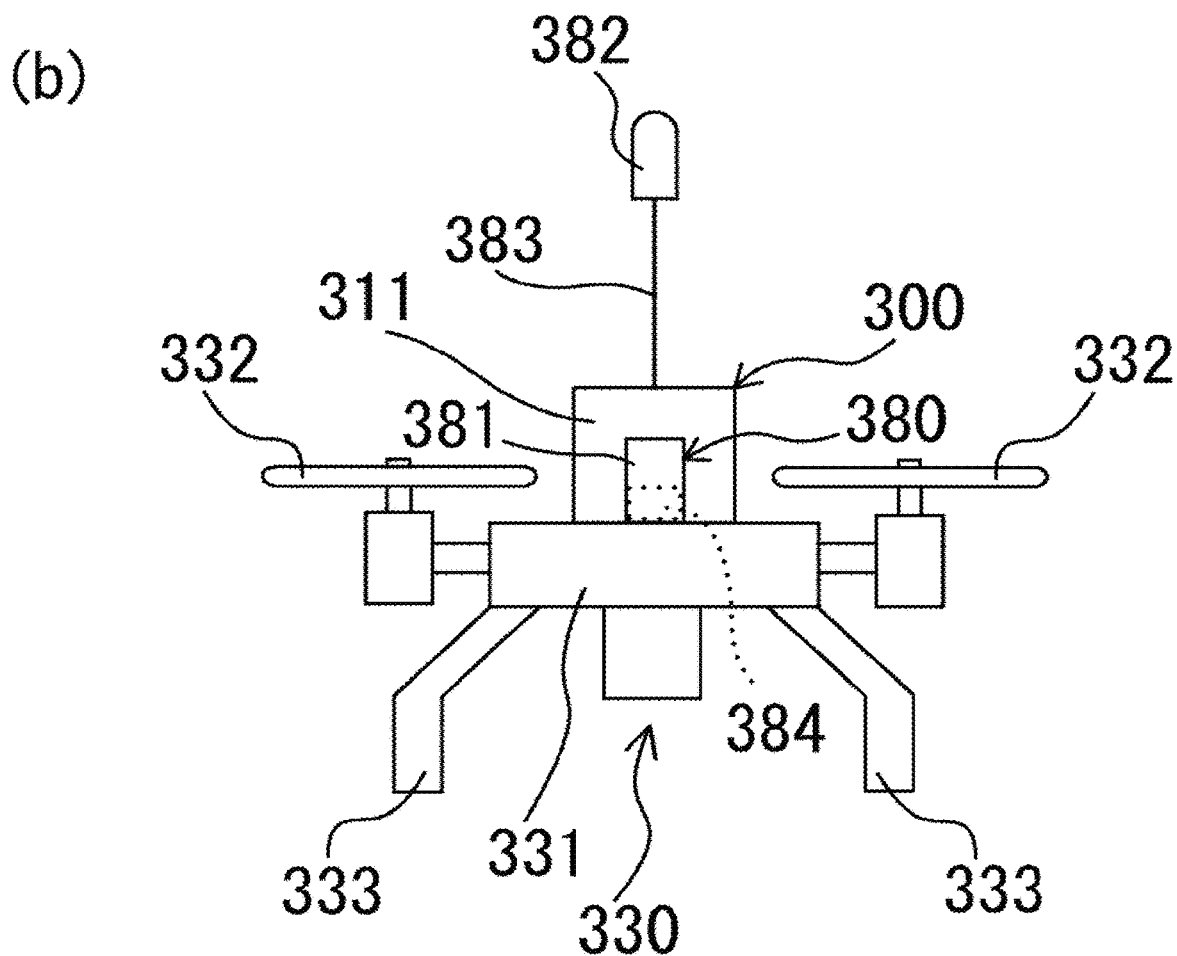

PARACHUTE, SAFETY DEVICE, AND FLIGHT VEHICLE PROVIDED WITH SAFETY DEVICE

TECHNICAL FIELD

The present invention relates to a parachute, a safety device, and a flight vehicle provided with the safety device.

BACKGROUND ART

In recent years, with the development of autonomous control technology and flight control technology, industrial use of a flight vehicle provided with a plurality of rotating wings called, for example, a drone is accelerating. Such a flight vehicle is expected to expand worldwide in the future.

On the other hand, the risk of a falling accident of the flight vehicle as described above is considered dangerous, which hinders the spread of the flight vehicle. Therefore, a parachute deployment device has been commercialized as a safety device in order to reduce the risk of a falling accident of the flight vehicle. As a parachute used in such a parachute deployment device, there has been conventionally, for example, a parachute including an umbrella edge portion having an air permeability of "small", an umbrella central portion having an air permeability of "large", and an umbrella top portion having an air permeability of "intermediate" between the umbrella edge portion and the umbrella central portion (see Patent Literature 1 below).

CITATIONS LIST

Patent Literature

Patent Literature 1: JP 2006-240532 A

SUMMARY OF INVENTION

Technical Problems

In the parachute of Patent Literature 1, air easily permeates from the umbrella central portion. Therefore, in a case where the parachute is folded in the initial state, it is slightly difficult to deploy a head top portion, and it is expected that it takes some time from the start of deployment until the parachute is completely deployed to the head top portion. Therefore, it is assumed that it is not suitable for use in a situation where it is desired to suppress an altitude loss as much as possible (an altitude is relatively low). In particular, in a safety device of a flight vehicle such as a drone, it is sometimes necessary to use a parachute in a situation where it is desired to suppress an altitude loss as much as possible (an altitude is relatively low). Therefore, it is considered that it is difficult to adopt the parachute of Patent Literature 1.

Therefore, the present invention has been made in view of such circumstances, and an object of the present invention is to provide a parachute that can be deployed more quickly than before, a safety device provided with the parachute, and a flight vehicle provided with the safety device.

Solutions to Problems (1) The present invention is a parachute including an umbrella body formed by using a plurality of base fabrics woven by combining a warp thread and a weft thread, the umbrella body including a head top portion and an umbrella edge portion, in which the umbrella body includes an impact buffer that buffers impact when the parachute is deployed, and a shape holder that holds a deployed shape of the parachute after the parachute is deployed, the impact buffer is an umbrella-shaped portion from the head top portion of the umbrella body to a midway position between the head top portion and the umbrella edge portion, and is formed by joining sides of the plurality of the base fabrics for the impact buffer (hereinafter, the base fabrics for the impact buffer) having a substantially trapezoidal shape in a circumferential direction and is formed in a state where each of the base fabrics for the impact buffer is disposed such that a line (hereinafter, a center line) connecting a vertex of the head top portion and a geometric center position of each of the base fabrics for the impact buffer makes an intersection with an extending direction of the warp thread and the weft thread of each of the base fabrics for the impact buffer, and the shape holder joins sides of the plurality of base fabrics for the shape holder (hereinafter, the base fabrics for the shape holder) having a substantially trapezoidal shape in a circumferential direction to form the umbrella body from the midway position to the umbrella edge portion, and includes one end portion connected to an edge portion of the impact buffer and has lower elasticity than the impact buffer.

(2) In the parachute of (1) described above, the shape holder is preferably formed by selecting any one of the warp thread and the weft thread for each of the base fabrics for the shape holder and disposing each of the base fabrics for shape holder such that an extending direction of the selected warp thread or weft thread is parallel to the center line.

(3) In the parachute of (1) or (2) described above, it is preferable that the impact buffer includes: a first member that forms an umbrella shape from the head top portion to a midway position (hereinafter, a midway position of the impact buffer) between the head top portion and a portion (hereinafter, a connection portion) connected to the shape holder: and the second member including one end portion connected to an edge portion of the first member and forming a portion from the midway position of the impact buffer to the connection portion, and a resin layer is provided on at least one of a front surface and a back surface of the second member.

(4) In the parachute of (3) described above, an area ratio between the first member and the second member is preferably 10 to 30(%):70 to 90(%).

(5) In the parachute of (1) to (4) described above, in a case where an angle of the intersection in a case where the center line coincides with an extending direction of the warp thread or the weft thread is 0°, an angle of the intersection in the impact buffer is 30° to 60°.

(6) A safety device of the present invention includes: a container including an opening: an object to be deployed contained in the container; and an ejection device that is provided in the container and ejects the object to be deployed to an outside of the container, in which the object to be deployed is the parachute according to any one of claims 1 to 5.

(7) In the safety device of (6) described above, it is preferable that the safety device is attachable to a flight vehicle and further includes an abnormality detection device capable of detecting an abnormality of the flight vehicle or a surrounding environment, and the abnormality detection device starts the ejection device in a case of detecting the abnormality.

(8) The safety device of (7) described above preferably further includes a flight control unit that stops a propulsion device provided in the flight vehicle in a case where the abnormality detection device detects the abnormality.

(9) In the safety device of (6) to (8) described above, the ejection device is preferably a pull-out ejection device that pulls out the parachute connected to another ejection object to an outside of the container by first ejecting the another ejection object ejects the parachute.

(10) In the safety device of (9) described above, preferably, a pilot chute having a configuration same as the parachute of (1) to (5) is connected to the parachute, and the ejection device ejects the pilot chute to pull out the parachute from the container.

(11) A flight vehicle of the present invention includes: an airframe; the safety device according to (6) to (10), the safety device being provided in the airframe; and one or more propulsion mechanisms coupled to the airframe to propel the airframe.

Advantageous Effects of Invention

According to the present invention, it is possible to provide a parachute that can be deployed more quickly than before, a safety device provided with the parachute, and a flight vehicle provided with the safety device.

BRIEF DESCRIPTION OF DRAWINGS

FIG. 6 is a side view of a flight vehicle on which a safety device including an ejection device of a modification is mounted.

FIG. 7 is a side view of a flight vehicle on which a safety device including an ejection device of a modification is mounted.

DESCRIPTION OF EMBODIMENT

Hereinafter, a safety device according to an embodiment of the present invention will be described with reference to the drawings. Note that, in the embodiment and the modifications thereof described below, a case where a parachute is used as an example of an object to be deployed in the safety device will be described. Note that examples of the parachute that can be used in the present embodiment include "flat circular (FLAT CIRCULAR)", "conical (CONICAL)", "biconical (BICONICAL)", "triconical (TRICONICAL)", "extended skirt (EXTENDED SKIRT)", "hemispherical (HEMISPHERICAL)", "guide surface (GUIDE SURFACE)", "annular (ANNULAR)", "cross (CROSS)", "flat ribbon (FLAT RIBBON)", "conical ribbon (CONICAL RIBBON)", "ribbon (RIBBON)", "ringslot (RINGSLOT)", "ring sail (RING SAIL)", "disc-gap-band (DISC-GAP-BAND)", "rotofoil (ROTAFOIL)", "vortex ring", "sandia RFD (SANDIA RFD)", "paracommander (PARACOMMANDER)", "parawing (PARAWING)", "parafoil (PARAFOIL)", "sailwing (SAILWING)", "volplane (VOLPLANE)", "ballute (BALLUTE)", and the like.

Figure 1:
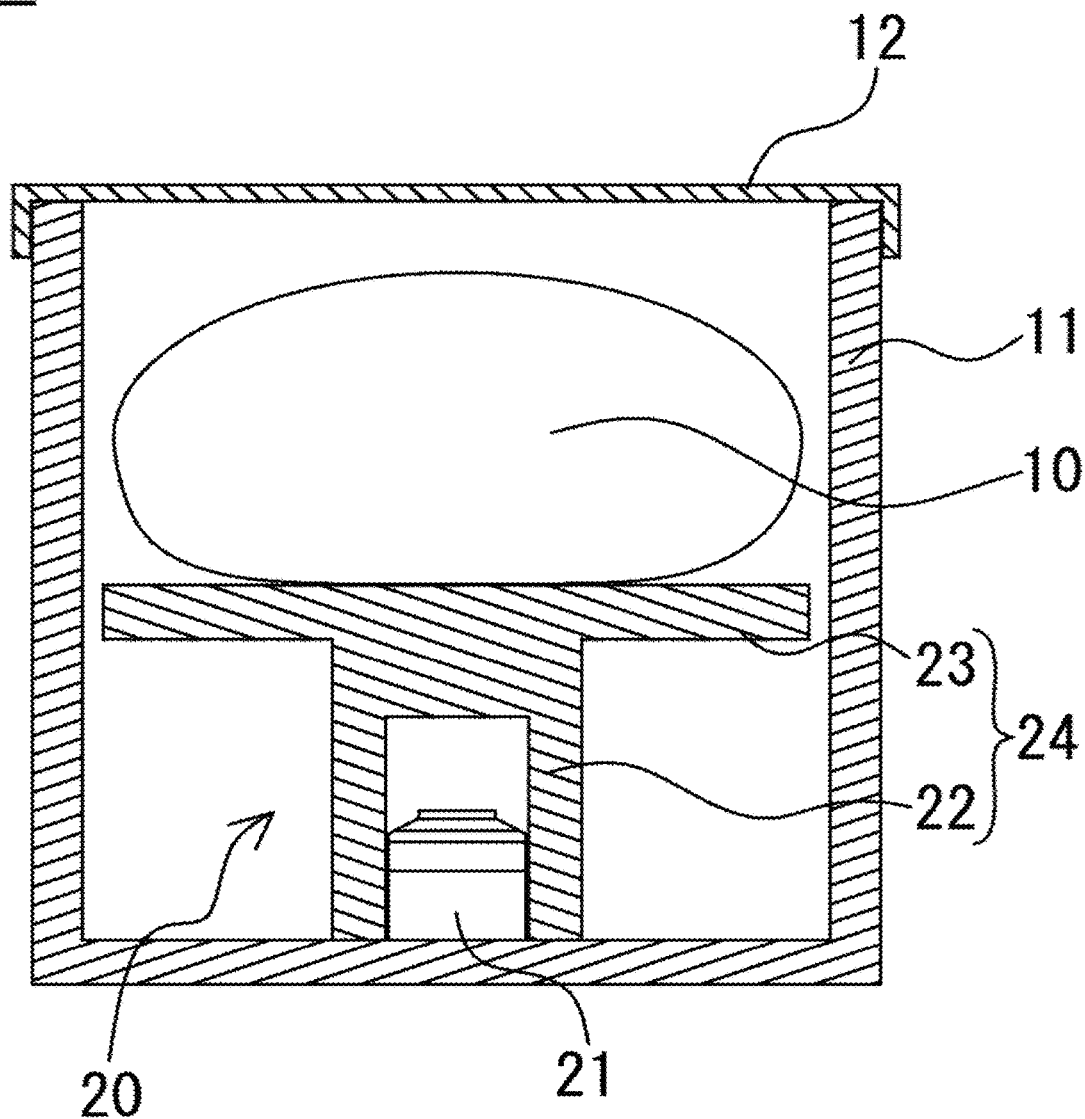
FIG. 1 is a schematic cross-sectional view of a safety device according to an embodiment of the present invention.

As illustrated in FIG. 1, a safety device 100 according to the present embodiment includes a parachute 10, a bottomed cylindrical container 11 that contains the parachute 10, and an ejection device 20 that is provided in the container 11 and ejects the parachute 10 to the outside of the container 11. Here, the ejection device 20 includes a gas generator 21 including a cup-shaped case that contains an ignition charge (not illustrated), and a piston 24 including a recess 22 and a piston head 23 integrally formed with the recess 22. Furthermore, the parachute 10 (an umbrella body 40 to be described later) is placed on the piston head 23 in a folded state. Note that, in the safety device 100 before activation, the parachute 10 is connected to the inside of the container 11 via a line 50 and a bridle line 70 described later, and the line 50 is folded and stored in the container 11 so as not to hinder the movement of the piston 24 at the time of activation. Furthermore, an opening end portion of the container 11 is closed by a lid 12 in the initial state, and is detached from the opening end portion by extrusion of the parachute 10.

Figure 2:
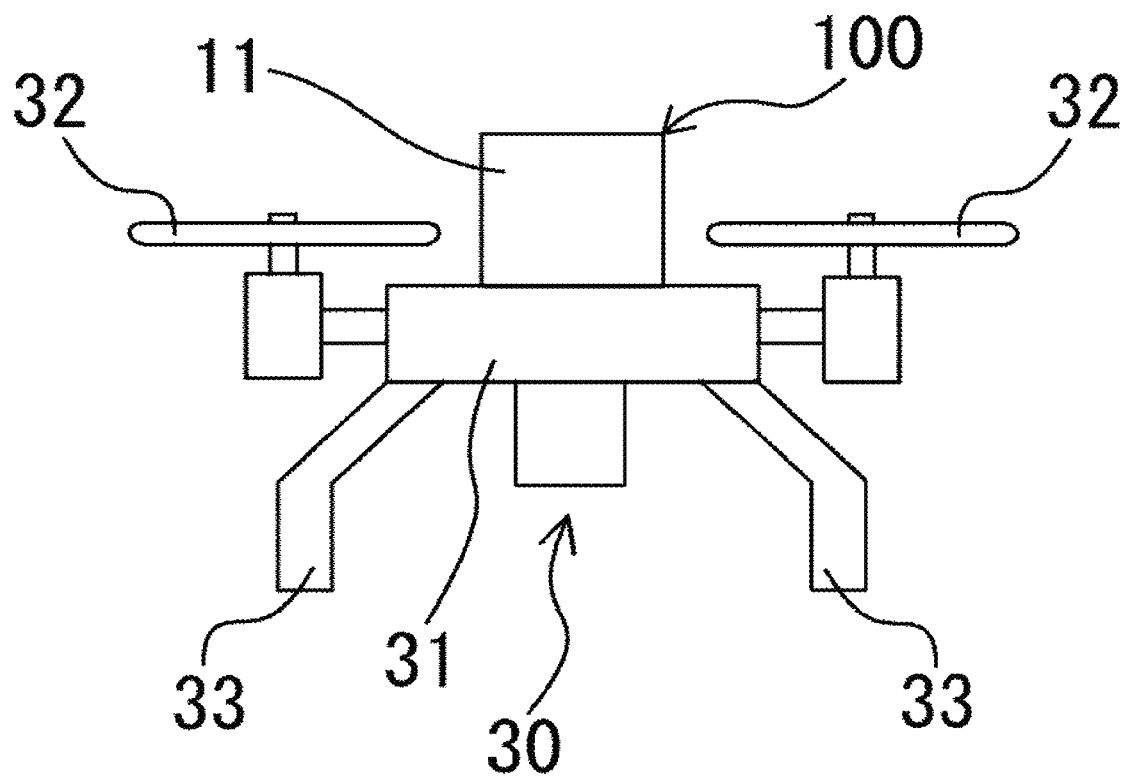
FIG. 2 is a side view of a flight vehicle on which the safety device of FIG. 1 is mounted.

FIG. 2 illustrates the safety device 100 and a flight vehicle 30 to which the safety device 100 is applied. The flight vehicle 30 includes an airframe 31, the safety device 100 provided in an upper portion of the airframe 31, one or more propulsion mechanisms (for example, propellers) 32 that are coupled to the airframe 31 and propel the airframe 31, and a plurality of legs 33 provided in a lower portion of the airframe 31. Furthermore, the flight vehicle 30 according to the present embodiment is not limited to an unmanned or manned aircraft such as a drone, and also includes an aircraft such as a passenger aircraft and a helicopter.

Figure 3:
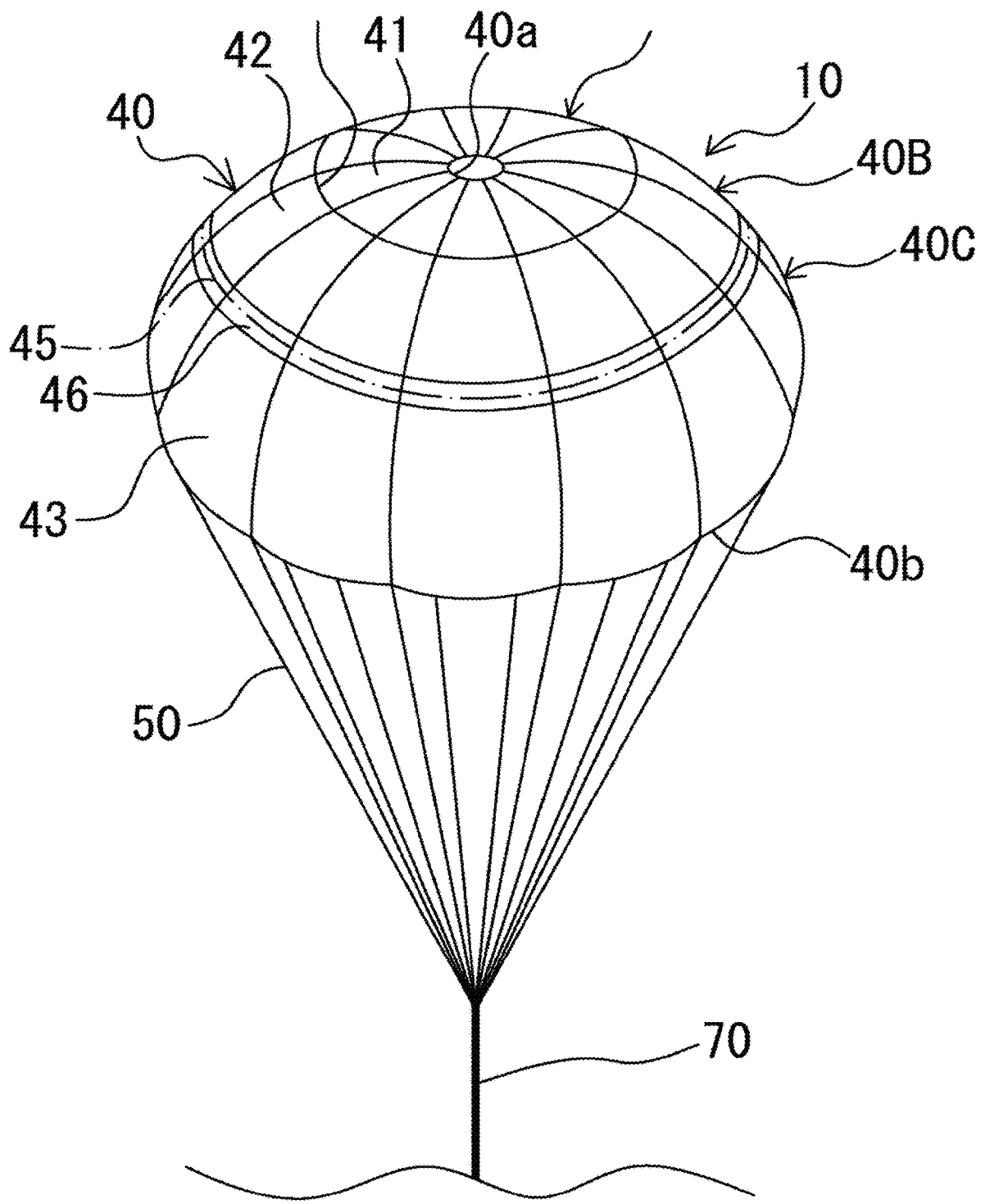
FIG. 3 is a perspective view illustrating a state of a parachute after deployment in the safety device of FIG. 1.

In such a configuration, when an abnormality is detected by an abnormality detection device 200 to be described later, the piston 24 is propelled by a gas pressure generated based on an ignition operation of the gas generator 21. As a result, the parachute 10 can be directly pushed out and developed by a propulsive force of the piston 24. Therefore, the parachute 10 after deployment illustrated in FIG. 3 is configured to be able to suspend the flight vehicle 30 (not illustrated in FIG. 3) via the line 50 and the bridle line 70. Note that, although a lower end of the bridle line 70 is not illustrated in FIG. 3, the lower end of the bridle line 70 is connected to the inside of the container 11.

As illustrated in FIG. 3, the parachute 10 includes the umbrella body 40, a plurality of the lines 50, and the bridle line 70 to which one end of each of the lines 50 is connected.

Figure 4:
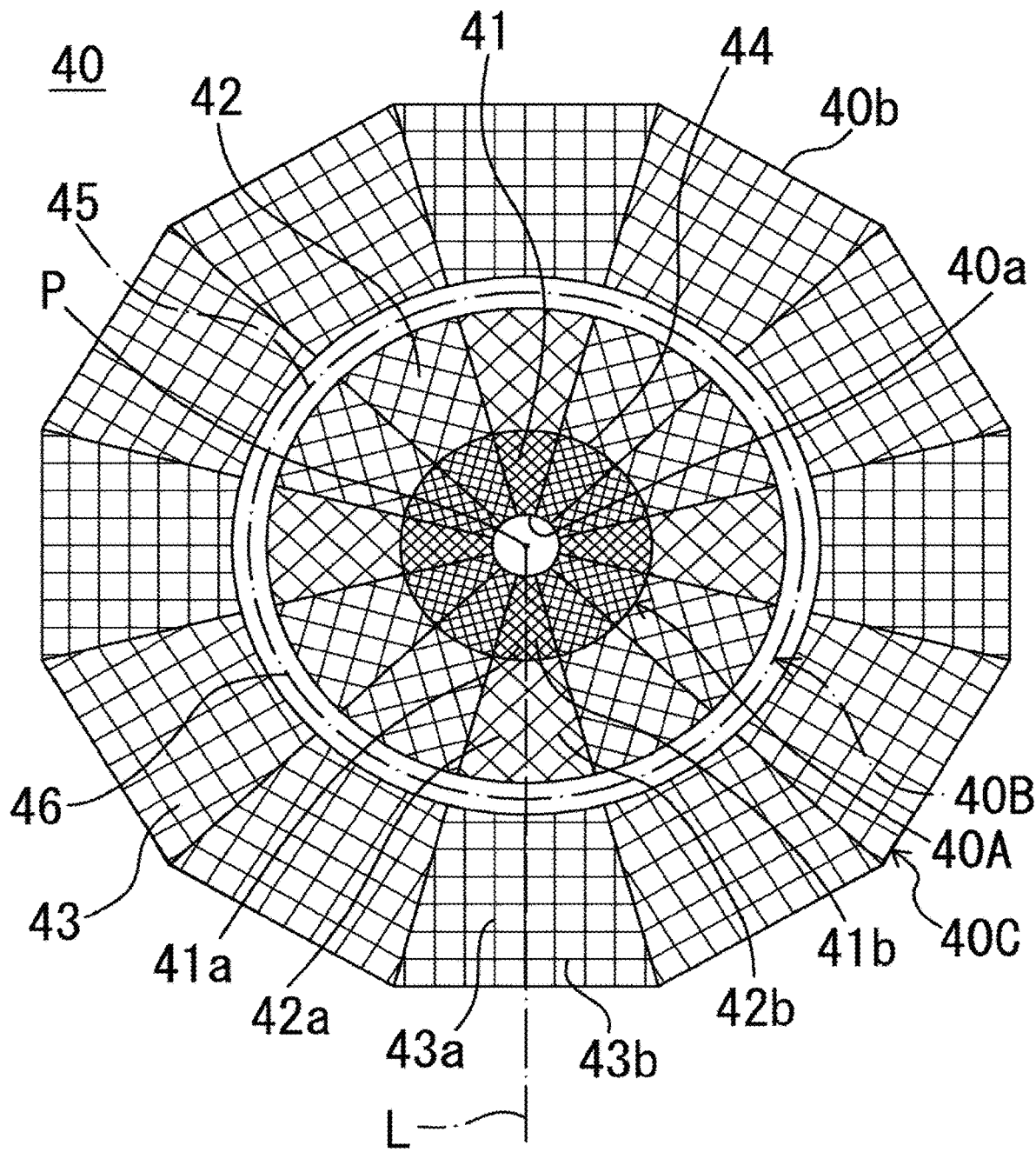
FIG. 4 is a schematic development view of a parachute in the safety device of FIG. 1.

As illustrated in FIGS. 3 and 4, the umbrella body 40 has a substantially hemispherical shape including a first impact buffer 40A (first member), a second impact buffer 40B (second member), and a shape holder 40C, and includes a vent 40a formed at a top portion and an umbrella edge portion 40b constituting an opening. Furthermore, the plurality of lines 50 are connected to the umbrella edge portion 40b. Note that each of the lines 50 is a cord-like connection member including one end connected to the umbrella edge portion 40b and the other end connected to the bridle line 70.

The first impact buffer 40A is an umbrella-shaped portion from a head top portion of the umbrella body 40 to a midway position (connection portion 44 between the first impact buffer 40A and the second impact buffer 40B) between the head top portion and the umbrella edge portion 40b, and is formed by joining sides of a plurality of base fabrics 41 having a substantially trapezoidal shape along a circumferential direction, for example, by sewing. The base fabrics 41 are formed by weaving warp threads 41a and weft threads 41b, which are raw threads. Note that in FIG. 4, each of the warp threads 41a and each of the weft threads 41b are schematically illustrated so that extending directions of the warp thread 41*a* and the weft thread 41*b* of each of the base fabrics 41 can be easily understood. Furthermore, also in base fabrics 42 and 43 described later, warp threads 42*a* and 43*a* and weft threads 42*b* and 43*b* are schematically illustrated in the same manner.

Furthermore, as illustrated in FIG. 4, the first impact buffer 40A is formed in a state where each of the plurality of (ten in the present embodiment) base fabrics 41 is disposed such that a line (for example, center line L in FIG. 4) connecting a vertex P of the head top portion of the umbrella body 40 and a geometric center position of each of the base fabrics 41 (on a line symmetry axis of the base fabric 41) intersects the extending direction of the warp thread 41*a* and the weft thread 41*b* of the base fabric 41 in plan view (here, on a plane of the paper surface of FIG. 4). Furthermore, an intersection angle between the center line L and the warp thread 41*a* or the weft thread 41*b* is preferably 30° to 60°, and more preferably 45°, assuming that the intersection angle in a case where the center line L coincides with the extending direction of the warp thread 41*a* or the weft thread 41*b* is 0°. Therefore, the first impact buffer 40A is relatively easily expanded and contracted in a direction along the center line L (easily deformed in the direction along the center line L). As a result, the impact when the parachute 10 is deployed can be buffered and suppressed.

Note that, since it is obvious that the geometric center position of the base fabric 41 is on the center line L formed by connecting the vertex P of the head top portion of the umbrella body 40 and a line symmetry axis of the base fabric 41, the center line L may be obtained by obtaining the geometric center position of the base fabric 41 using various conventional obtaining methods (including those obtained by calculation by software using a computer) and then forming a line segment connecting the vertex P of the head top portion of the umbrella body 40 and the geometric center position of the base fabric 41.

The second impact buffer 40B is a portion that forms from the connection portion 44 to the connection portion 45 between the second impact buffer 40B and the shape holder 40C, and is formed by joining the sides of the plurality of base fabrics 42 having a substantially trapezoidal shape along the circumferential direction, for example, by sewing. The base fabrics 42 are formed by weaving the warp threads 42*a* and the weft threads 42*b*, which are raw threads.

Furthermore, as illustrated in FIG. 4, the second impact buffer 40B is formed in a state in which each of the plurality of (ten in the present embodiment) base fabrics 42 is disposed such that a line (for example, the center line L in FIG. 4) connecting the vertex P of the head top portion of the umbrella body 40 and the geometric center position of each of the base fabrics 42 (on a line symmetry axis of the base fabric 42) intersects the extending direction of the warp thread 42*a* and the weft thread 42*b* of the base fabric 42. Furthermore, an intersection angle between the center line L and the warp thread 42*a* or the weft thread 42*b* is preferably 30° to 60°, and more preferably 45°, assuming that the intersection angle in a case where the center line L coincides with the extending direction of the warp thread 42*a* or the weft thread 42*b* is 0°. Furthermore, a resin layer (thickness: 50 μm to 550 μm) is provided on at least one of a front surface and a back surface of the second impact buffer 40B so as to fill a network portion formed by the warp thread 42*a* and the weft thread 42*b*. As the resin layer, a reaction product of a polyol of aliphatic PES (Poly (ethylene succinate))/PET and an HDI isocyanurate trimer can be used. The reaction product is a crosslinked copolymer of polyester/ polyurethane. Furthermore, the resin layer may be polyether, polysiloxane, polyamide, polyester, polyolefin, polyurethane, polyurea, or the like.

Therefore, the second impact buffer 40B is less likely to expand and contract as compared with the first impact buffer 40A and has a lower air permeability, but is more likely to expand and contract in the direction along the center line L as compared with the shape holder 40C described later. As a result, the impact due to the deformation of the first impact buffer 40A when the parachute 10 is deployed can be mitigated, and the impact can be less likely to be transmitted to the shape holder 40C. Here, an area ratio between the first impact buffer 40A (first member) and the second impact buffer 40B (second member) is preferably 10 to 30(%):70 to 90(%).

One end portion of the shape holder 40C is connected to an edge portion (connection portion 45) of the second impact buffer 40B, and sides of the plurality of base fabrics 43 having a substantially trapezoidal shape are joined in the circumferential direction to form a portion from the connection portion 45 to the umbrella edge portion 40*b*. The base fabrics 43 are formed by weaving the warp threads 43*a* and the weft threads 43*b*, which are raw threads.

Furthermore, as the shape holder 40C, members selected as follows are used. That is, in a case where any one of the warp threads 43*a* and the weft threads 43*b* of the base fabrics 43 is selected and the warp thread 43*a* is selected, the shape holder is formed in a state in which each of the base fabrics 43 is disposed such that an intersection angle between an extending direction of the selected warp thread 43*a* and the center line L is 0° to 30° (preferably 0°), assuming that the intersection angle in a case where the center line L coincides with the extending direction of the warp thread 43*a* is 0°. On the other hand, in a case where the weft thread 43*b* is selected, the shape holder is formed in a state in which each of the base fabrics 43 is disposed such that an intersection angle between an extending direction of the weft thread 43*b* and the center line L is 60° to 90° (preferably 90°). Thus, the shape holder is formed in a state in which each of the base fabrics 43 is disposed. Furthermore, in the shape holder 40C, in a case where the extending direction of the selected warp thread 43*a* or weft thread 43*b* (warp thread 43*a* in the present embodiment) is parallel to the center line L (In a case where the intersection angle between the extending direction of the warp thread 43*a* and the center line L is 0°, or in a case where the intersection angle between the extending direction of the weft thread 43*b* and the center line L is 90°), the base fabric 43 has lower elasticity in the direction along the center line L than the first impact buffer 40A and the second impact buffer 40B (is less likely to deform in the direction along the center line L). Therefore, the shape of the shape holder 40C after the deployment of the parachute 10 is sufficiently held as compared with the first impact buffer 40A and the second impact buffer 40B.

Here, in each base fabric, a relationship of air permeability of the base fabric 41>air permeability of the base fabric 42=air permeability of the base fabric 43 is satisfied. Furthermore, in the umbrella body 40, a relationship of air permeability of the first impact buffer 40A>air permeability of the shape holder 40C>air permeability of the second impact buffer 40B is satisfied. Here, as an example, the air permeability of the base fabric 41 is preferably 70 to 500 (ft$^3$/min/ft$^2$), the air permeability of the base fabric 42 is preferably 0 to 50 (ft$^3$/min/ft$^2$), and the air permeability of the base fabric 43 is preferably 0 to 50 (ft$^3$/min/ft$^2$). Furthermore, preferably, the air permeability of the first impact buffer 40A is 80 to 120 (ft$^3$/min/ft$^2$), the air permeability of the second impact buffer 40B is 0 to 3 (ft$^3$/min/ft$^2$), and the air permeability of the shape holder 40C is 0 to 3 (ft$^3$/min/ft$^2$). Note that here, the air permeability is measured based on ASTM D737 (standard test method regarding air permeability of fiber fabric).

Furthermore, examples of a material of raw threads of the base fabrics 41, 42, and 43 include those obtained using polyamide such as nylon 66, nylon 46, nylon 6, and aramid, polyester such as polyethylene terephthalate, polyolefin such as polyethylene and polypropylene, or the like as a raw material. Furthermore, the base fabrics 41, 42, and 43 preferably have a thickness of 30d (denier) to 1260 (for example, any of 40d, 50d, 70d, 100d, 210d, 420d, 840d, 1050d, and 1260d) as raw threads, and are preferably fabrics in which the number of threads per inch is 20 to 150 (the number of warp threads and the number of weft threads may be different). Furthermore, the base fabrics 41, 42, and 43 preferably have a breaking strength of 40 to 1100 pounds/(¾ inch). Here, as an example of the breaking strength of the base fabrics 41, 42, and 43, the base fabric 41 is 42 pounds/(¾ inch), and the base fabrics 42 and 43 are 45 pounds/(¾ inch).

A reinforcing tape 46 is a member for reinforcing the connection portion 45, and can further reduce the impact caused by the deformation of the first impact buffer 40A when the parachute 10 is deployed and make it difficult to transmit the impact to the shape holder 40C.

Furthermore, the safety device 100 includes the abnormality detection device 200 (not illustrated in FIG. 2) including an acceleration sensor or the like that detects an abnormality of the flight vehicle 30.

Figure 5:
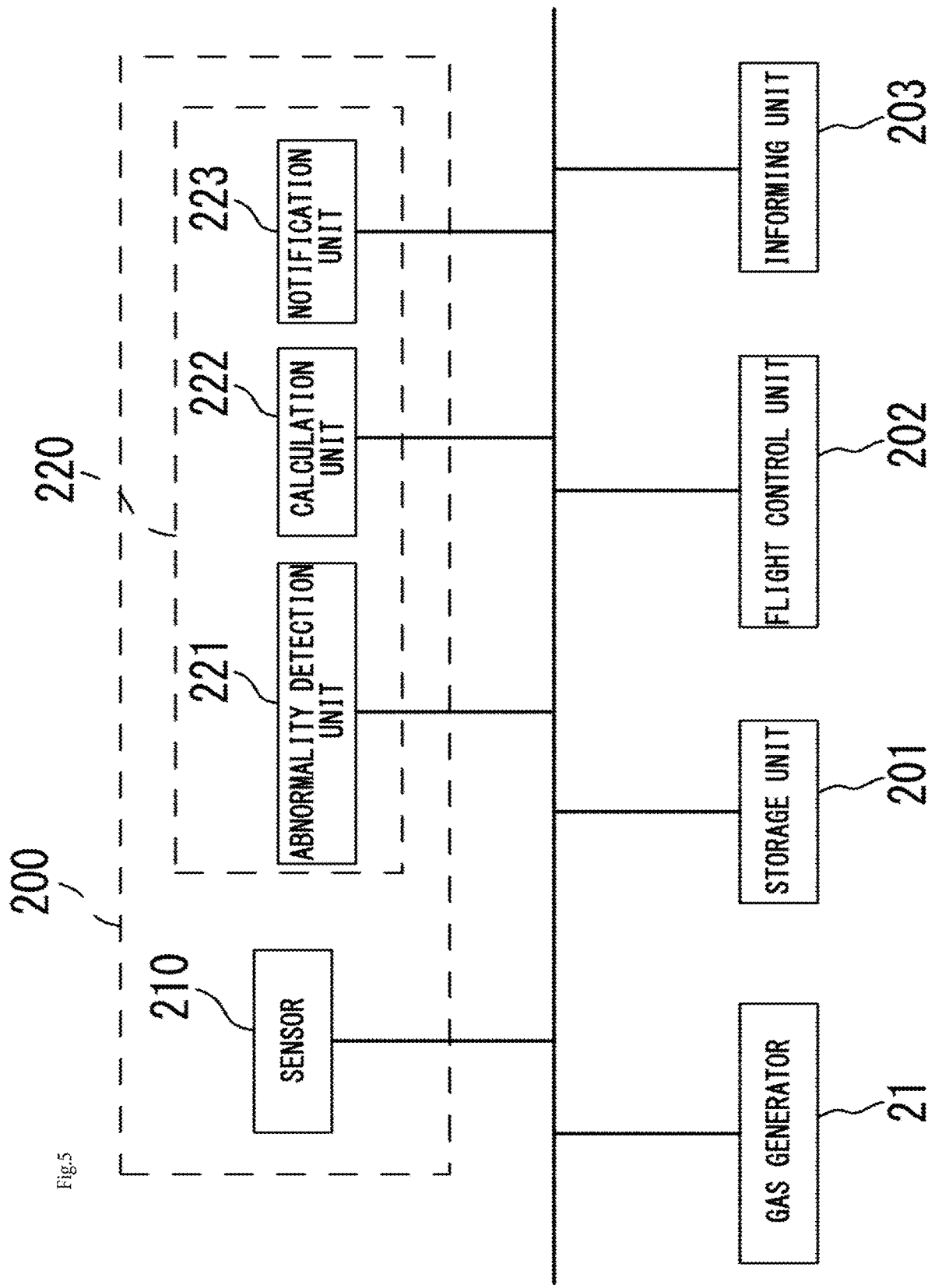
FIG. 5 is a block diagram illustrating a functional configuration of the safety device of FIG. 1.

Here, a functional configuration of the abnormality detection device 200 will be described. As illustrated in FIG. 5, the abnormality detection device 200 includes a sensor (detection unit) 210 and a control unit (computer including CPU, ROM, RAM, and the like) 220, and is electrically connected to an igniter in the gas generator 21 of the ejection device 20, a storage unit 201, a flight control unit 202, and an information unit 203.

The sensor 210 detects a flight state (including collision, crash, etc.) of the flight vehicle 30. Specifically, the sensor 210 is, for example, one or more sensors selected from an acceleration sensor, a gyro sensor, an atmospheric pressure sensor, a laser sensor, an infrared sensor, a vision sensor of a monocular/compound eye, an ultrasonic sensor, a voltmeter, a fuel meter, and the like, and can acquire data of a flight state of the flight vehicle 30, data of a surrounding environment (obstacle, topography, shape of building or the like), data of a power supply amount, data of a fuel amount, and the like, such as a speed, an acceleration, an angular acceleration, a tilt, an altitude, a position of the flight vehicle 30, and an obstacle that can be a flight obstacle of the flight vehicle 30.

The control unit 220 includes an abnormality detection unit 221, a calculation unit 222, and a notification unit 223 as a functional configuration. The abnormality detection unit 221, the calculation unit 222, and the notification unit 223 are functionally implemented by the control unit 220 executing a predetermined program.

The abnormality detection unit 221 not only detects an abnormal state related to the surrounding environment on the basis of information received from the sensor 210 but also detects a flight state of the flight vehicle 30 (whether the flight vehicle is in an abnormal state such as falling during flight). That is, the abnormality detection unit 221 detects whether or not the sensor 210 and the flight vehicle 30 are normally operable. For example, the abnormality detection unit 221 can detect an emergency state of a person inside the flight vehicle 30, a fatal failure of a device inside the flight vehicle 30, a power supply of the flight vehicle 30 being less than or equal to a preset predetermined value, a fuel amount of the flight vehicle 30 being less than or equal to a preset predetermined value, an acceleration or an angular velocity of the flight vehicle 30 being greater than or equal to a predetermined value or less than or equal to a predetermined value, an attitude angle of the flight vehicle 30 being greater than or equal to a predetermined value, a descent speed of the flight vehicle 30 being greater than or equal to a predetermined value, and the like. Furthermore, in a case where the flight vehicle 30 is operated by an operator using a controller, the abnormality detection unit 221 can detect disappearance of an operation signal or reception of an abnormality signal from the controller. Furthermore, the abnormality detection unit 221 can detect disappearance of a signal or reception of an abnormal signal from a ground station.

The calculation unit 222 determines whether or not the flight state of the flight vehicle 30 is abnormal on the basis of each data obtained by actual measurement by the sensor 210. Specifically, the calculation unit 222 determines an abnormality by comparing each data acquired by the sensor 210 with each preset threshold. Furthermore, the calculation unit 222 receives an obstacle detection signal, a distance detection signal, an altitude detection signal, and the like from the sensor 210 in real time, and determines an abnormality on the basis of each of these received signals. Furthermore, the calculation unit 222 determines whether the flight vehicle approaches a prohibited area, enters the prohibited area, or deviates from a planned route on the basis of the position information of the flight vehicle 30.

Furthermore, in a case of determining that the flight state of the flight vehicle 30 is abnormal, the calculation unit 222 outputs an abnormality signal (which may include a command signal for starting or activating another device) to the outside. Note that an abnormality signal output unit may be provided separately from the calculation unit 222, and the abnormality signal output unit may output an abnormality signal according to a command of the calculation unit 222.

In a case where the abnormality detection unit 221 detects an abnormality in the sensor 210 and the flight vehicle 30, the notification unit 223 notifies an administrator or the like that the abnormality has been detected.

The storage unit 201 can store various data such as each data acquired by the sensor 210 and determination data in a case where an abnormality is determined by the calculation unit 222.

The flight control unit 202 controls a flight attitude of the flight vehicle 30, and can stop a propulsion device (such as a motor) provided in the flight vehicle 30 in a case where the calculation unit 222 determines an abnormality.

In a case where the calculation unit 222 determines an abnormality, the information unit 203 can inform the surroundings of the abnormality. For example, the information unit 203 activates a voice generation device (such as an alarm) and/or a lighting device (such as an LED) to inform the surroundings of the abnormality.

Next, the operation of the safety device 100 will be described.

First, in a case where the flight vehicle 30 is in an abnormal situation during flight, when the abnormality detection unit 221 detects an abnormal state, detects disappearance of an operation signal from the controller, or the operator operates the controller to transmit an abnormality signal to the safety device 100, the abnormality detection unit 221 transmits an abnormality signal to the calculation unit 222. Upon receiving the abnormality signal, the calculation unit 222 transmits an operation signal to the gas generator 21 of the ejection device 20. Upon receipt of this operating signal, the gas generator 21 starts the igniter and propels the piston 24 with the generated gas pressure. With this propulsion force, the umbrella body 40 of the parachute 10 is ejected to the outside of the container 11. Then, the bridle line 70 connected to the plurality of lines 50 connected to the ejected umbrella body 40 extends, the umbrella body 40 starts to deploy, and the inflow of air from the umbrella edge portion 40b to the inside of the umbrella body 40 starts. Then, while the first impact buffer 40A buffers and suppresses the impact when the parachute 10 is deployed, the second impact buffer 40B alleviates the impact and the shape of the deployed parachute 10 is held by the shape holder 40C with difficulty in transmitting the impact to the shape holder 40C. Thereafter, after the line 50 and the bridle line 70 are fully extended and stretched, that is, after the line 50 and the bridle line 70 are tensioned, the umbrella body 40 is fully opened (see FIG. 3).

According to the above configuration, it is possible to provide the parachute 10 that can be deployed more quickly than before, the safety device 100 provided with the parachute 10, and the flight vehicle 30 provided with the safety device 100.

Furthermore, according to the above configuration, while the first impact buffer 40A buffers and suppresses the impact when the parachute 10 is deployed, the second impact buffer 40B alleviates the impact, and the shape of the deployed parachute 10 can be held by the shape holder 40C in a state where it is difficult to transmit the impact to the shape holder 40C. That is, in the parachute 10, an opening force at the time of deployment can be reduced, and a necessary and sufficient air resistance maintaining force can be obtained after deployment.

Furthermore, since the base fabric 43 constituting the shape holder 40C is relatively less likely to stretch (less likely to be deformed), the shape of the parachute 10 is less likely to collapse after the parachute 10 is deployed. That is, after the parachute 10 is deployed, the flight vehicle 30 hung on the parachute 10 is relatively less likely to shake and is stable.

Although the embodiment of the present invention has been described above, it is merely an example, and the present invention is not particularly limited, and the specific configuration and the like can be modified in design as appropriate. Furthermore, the actions and effects described in the embodiment of the present invention merely enumerate the most suitable actions and effects resulting from the present invention, and the actions and effects according to the present invention are not limited to those described in the embodiment of the present invention. For example, the following modifications are also conceivable.

In the above embodiment, as illustrated in FIGS. 3 and 4, the base fabrics are disposed such that the positions of the sides of the base fabrics 41, 42, and 43 constituting the first impact buffer 40A, the second impact buffer 40B, and the shape holder 40C are in a straight line. However, the positions may not necessarily be in a straight line, and may be shifted.

Furthermore, instead of the portion of the first impact buffer 40A of the above embodiment, an area of the second impact buffer 40B may be increased to form an umbrella body including only the second impact buffer and the shape holder. The air permeability of the second impact buffer at this time is preferably adjusted to a value between the first impact buffer 40A and the second impact buffer 40B. That is, it is preferable to form the second impact buffer using a base fabric having an air permeability between the first impact buffer 40A and the second impact buffer 40B.

Furthermore, instead of the portion of the second impact buffer 40B of the above embodiment, an area of the first impact buffer 40A may be increased to form an umbrella body including only the first impact buffer and the shape holder. The air permeability of the first impact buffer at this time is preferably adjusted to a value between the first impact buffer 40A and the second impact buffer 40B. That is, it is preferable to form the first impact buffer using a base fabric having an air permeability between the first impact buffer 40A and the second impact buffer 40B. Alternatively, in the first impact buffer, a resin layer may be formed on at least one surface of a portion corresponding to the second impact buffer of the above embodiment to adjust air permeability.

Furthermore, the base fabric 43 in the above embodiment may be any base fabric as long as the base fabric has lower elasticity than the first impact buffer 40A and the second impact buffer 40B and can maintain the deployed shape.

Furthermore, in the above embodiment and modifications, the flight vehicle may include an airbag device that inflates an airbag. For example, the airbag device can be provided at the lower portion of the airframe in a normal attitude so as to face a main body of the safety device provided at the upper portion of the airframe in the normal attitude with the airframe interposed therebetween. In this case, the impact on the flight vehicle at the time of landing on the water can be further reduced.

Furthermore, in the above embodiment and modifications, the flight vehicle or the safety device may include a float (floating bag). This makes it possible to prevent sinking in water at the time of water landing.

Furthermore, in the above embodiment and modifications, in a case where the flight vehicle can carry a person inside, an impact-absorbing member may be adopted for the seat.

Furthermore, in the above embodiment and modifications, the gas generator is adopted as a drive source of the ejection device, but the drive source is not limited thereto, and for example, an elastic body type using an elastic body such as a spring, a gas cylinder type using a gas pressure confined in a container, a chemical reaction type (non-gunpowder) in which two or more substances are mixed and chemically reacted to generate a gas pressure, or the like may be adopted. Furthermore, in a case where the opening force is relatively large (For example, in a case where the flight vehicle is in an abnormal state during flight, and the safety device activates.), it is preferable to use a pull-out (also referred to as a tensile) ejection device instead of the ejection device of the above-described embodiment and modifications. Examples of the pull-out ejection device include a method of launching a rocket and pulling out a parachute, a method of releasing a weight with an actuator and pulling out a parachute, a method of launching a projectile with an actuator and pulling out a parachute, and a method of first ejecting a pilot chute and pulling out a parachute with the pilot chute.

Here, a method of launching a rocket and pulling out a parachute, a method of releasing a weight with an actuator and pulling out a parachute, a method of launching a projectile with an actuator and pulling out a parachute, and a method of first ejecting a pilot chute and pulling out a parachute with the pilot chute, which are examples of the above-described pull-out ejection device, will be described. Note that portions having the same reference signs as those in the above embodiment in the last two digits are the same as those described in the above embodiment unless otherwise specified, and thus description thereof is omitted.

(Pull-Out Ejection Device 280 that Launches Rocket and Pulls Out Parachute)

As illustrated in FIG. 6, an ejection device 280 provided on an airframe 231 outside a safety device 290 includes an accommodation unit 281 that accommodates a rocket 282 in an initial state (see FIG. 6(a)), the rocket 282 connected to a parachute (not illustrated) in a container 211 of the safety device 290 via a line 283 (see FIG. 6(b)), and a flight control unit (not illustrated) similar to the flight control unit 202. The rocket 282 includes a propellant (not illustrated) of a gunpowder type or a chemical reaction type (non-gunpowder) in a lower portion, and is driven to be launched upward as illustrated in FIG. 6(b) in a case of receiving a launch command signal from a flight control unit in an abnormal state. As a result, it is possible to launch the rocket 282 at the time of abnormality, pull out the parachute in the container 211 to the outside of the container 211, and then deploy the parachute.

(Pull-Out Ejection Device 380 that Release Weight with Actuator and then Pulls Out Parachute)

As illustrated in FIG. 7, an ejection device 380 provided on an airframe 331 outside a safety device 300 includes an accommodation unit 381 that accommodates a weight 382 in an initial state (see FIG. 7(a)), the weight 382 connected to a parachute (not illustrated) in a container 311 of the safety device 300 via a line 383 (see FIG. 6(b)), an actuator 384, and a flight control unit (not illustrated) similar to the flight control unit 202. The actuator 384 may be the same as the ejection device 20 of the above embodiment, or may employ a drive source such as an elastic body type using an elastic body such as a spring, a gas cylinder type using a gas pressure confined in a container, or a chemical reaction type (non-gunpowder) in which two or more substances are mixed and chemically reacted to generate a gas pressure. In a case where the actuator 384 receives a firing command signal from the flight control unit at the time of abnormality, the actuator is driven, and can launch the weight 382 in the upper direction as illustrated in FIG. 7(b). As a result, at the time of abnormality, after the weight 382 is released and the parachute in the container 311 is pulled out of the container 311, the parachute can be deployed.

(Pull-Out Ejection Device that Launches Projectile with Actuator and then Pulls Out Parachute)

A safety device 400 includes parachutes 456 and 457, a cup-shaped container 451 that contains the parachutes 456 and 457 before deployment, a support column 452 provided at an inner bottom portion of the container 451, actuators 421, 422, and 423 inside, three tube portions 453, 454, and 455 connected to the support column 452, and a flight control unit (not illustrated) similar to the flight control unit 202. The actuator 421 is provided in the tube portion 453, the actuator 422 is provided in the tube portion 454, and the actuator 423 is provided in the tube portion 455. The tube portions 453, 454, and 455 are disposed to face different directions, for example, like an umbrella rib.

A projectile 453a is inserted into the tube portion 453 in a partially exposed state, similarly, a projectile 454a is inserted into the tube portion 454 in a partially exposed state, and a projectile 455a is inserted into the tube portion 455 in a partially exposed state. The parachute 456 is connected to the projectile 453a by a string 458 and is connected to the projectile 455a by a string 459. Furthermore, the parachute 457 is connected to the projectile 455a by a string 460 and is connected to the projectile 454a by a string 461. In a case where the actuator 421, 422, 423 receives the firing instruction signal from the flight control unit in the abnormal state, the actuator can be driven to launch the projectiles 453a, 454a, and 455a in arrow directions of FIG. 8 in the abnormal state.

Note that the above-described actuators 421, 422, and 423, the support column 452, the tube portions 453, 454, and 455, the projectiles 453a, 454a, and 455a, and the like mainly constitute the ejection device of the present modification.

Figure 8:
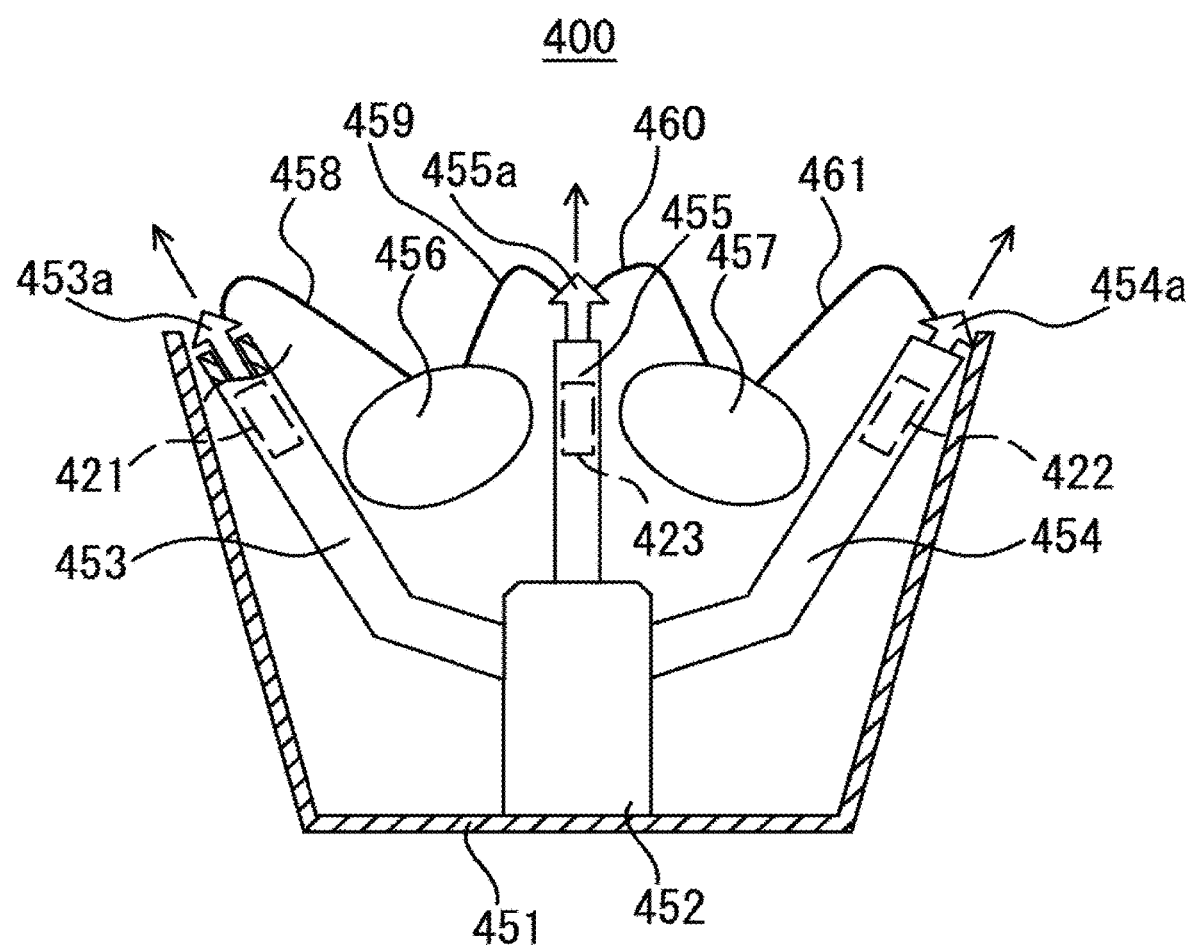
FIG. 8 is a schematic cross-sectional view of a safety device including an ejection device of a modification.

As a result, in an abnormal state, the projectiles 453a, 454a, and 455a are launched in the arrow directions of FIG. 8, the parachutes 456 and 457 in the container 451 are pulled out of the container 451, and then the parachutes 456 and 457 can be deployed. Note that only one of the parachutes 456 and 457 may be provided.

(Pull-Out Ejection Device that Pulls Out Parachute with Pilot Chute)

Instead of the weight 382 of the ejection device 380 (FIG. 7) described above, a pilot chute (not illustrated) may be connected to the line 383, and in an abnormal state, the pilot chute may be first ejected and deployed, a parachute (not illustrated) in the container 211311 may be pulled out, and then the parachute may be deployed. Here, the pilot chute may have the same configuration as the parachute 10 of the above embodiment.

Furthermore, in the above embodiment and modifications, the case where the other ends of the line and the center code are connected to the inside of the container has been described, but the present invention is not limited thereto, and for example, the line and the center code may be connected to the outside of the container or the airframe of the flight vehicle.

Furthermore, in the above embodiment and modifications, the example in which the safety device is attached to the flight vehicle has been described, but the present invention is not limited thereto. For example, in a case where a cargo is dropped from a flight vehicle onto water, it is also possible to attach the safety device according to the present invention to the cargo before being dropped for use.

Furthermore, the shape holder according to the above embodiment may further include a resin layer similar to the resin layer of the second impact buffer. In this case, the air permeability of the first impact buffer>the air permeability of the shape holder=the air permeability of the second impact buffer.

REFERENCE SIGNS LIST 10, 456, 457 parachute
11, 211, 311, 451 container
12 lid
20, 280, 380 ejection device
21 gas generator
22 recess
23 piston head
24 piston
30, 230, 330 flight vehicle
31, 232, 331 airframe
32, 232, 332 propulsion mechanism
33, 233, 333 leg
40 umbrella body
40A first impact buffer
40B second impact buffer
40C shape holder
40a vent
40b umbrella edge portion 41, 42, 43 base fabric
41a, 42a, 43a warp thread
41b, 42b, 43b weft thread
44, 45 connection portion
46 reinforcing tape
50, 283, 383 line
70 bridle line
100, 290, 300, 400 safety device
200 abnormality detection device
201 storage unit
202 flight control unit
203 information unit
210 sensor
220 control unit
221 abnormality detection unit
222 calculation unit
223 notification unit
281, 381 accommodation unit
282 rocket
382 weight
384, 421, 422, 423 actuator
452 support column
453, 454, 455 tube portion
453a, 454a, 455a projectile
458, 459, 460, 461 string
L center line
P vertex

The invention claimed is:

1. A parachute comprising:
an umbrella body formed by using a plurality of base fabrics woven by combining a warp thread and a weft thread, the umbrella body including a head top portion and an umbrella edge portion, wherein the umbrella body includes an impact buffer that buffers impact when the parachute is deployed, and a shape holder that holds a deployed shape of the parachute after the parachute is deployed,
the impact buffer is an umbrella-shaped portion from the head top portion of the umbrella body to a midway position between the head top portion and the umbrella edge portion, and is formed by joining sides of the plurality of the base fabrics for the impact buffer having a substantially trapezoidal shape in a circumferential direction and is formed in a state where each of the base fabrics for the impact buffer is disposed such that a center line connecting a vertex of the head top portion and a geometric center position of each of the base fabrics for the impact buffer makes an intersection with an extending direction of the warp thread and the weft thread of each of the base fabrics for the impact buffer,
the shape holder joins sides of the plurality of base fabrics for the shape holder having a substantially trapezoidal shape in a circumferential direction to form the umbrella body from the midway position to the umbrella edge portion, and includes one end portion connected to an edge portion of the impact buffer and has lower elasticity than the impact buffer, and
wherein the shape holder is formed by selecting any one of the warp thread and the weft thread for each of the base fabrics for the shape holder and disposing each of the base fabrics for shape holder such that an extending direction of the selected warp thread or weft thread is parallel to the center line.

2. The parachute according to claim 1, wherein the impact buffer includes:
a first member that forms an umbrella shape from the head top portion to a midway position of the impact buffer between the head top portion and a connection portion connected to the shape holder; and
a second member including one end portion connected to an edge portion of the first member and forming a portion from the midway position of the impact buffer to the connection portion, and a resin layer is provided on at least one of a front surface and a back surface of the second member.

3. A safety device comprising:
a container including an opening;
an object to be deployed contained in the container; and
an ejection device that is provided in the container and ejects the object to be deployed to an outside of the container,
wherein the object to be deployed is the parachute according to claim 1.

4. The parachute according to claim 1, wherein an angle of the intersection where the center line coincides with an extending direction of the warp thread or the weft thread is 0°, an angle of the intersection in the impact buffer is 30° to 60°.

5. A safety device comprising:
a container including an opening;
an object to be deployed contained in the container; and
an ejection device that is provided in the container and ejects the object to be deployed to an outside of the container,
wherein the object to be deployed is the parachute according to claim 4.

6. The parachute according to claim 1, wherein the impact buffer includes:
a first member that forms an umbrella shape from the head top portion to a midway position of the impact buffer between the head top portion and a connection portion connected to the shape holder; and
a second member including one end portion connected to an edge portion of the first member and forming a portion from the midway position of the impact buffer to the connection portion, and
a resin layer is provided on at least one of a front surface and a back surface of the second member.

7. The parachute according to claim 6, wherein an angle of the intersection where the center line coincides with an extending direction of the warp thread or the weft thread is 0°, an angle of the intersection in the impact buffer is 30° to 60°.

8. A safety device comprising:
a container including an opening;
an object to be deployed contained in the container; and
an ejection device that is provided in the container and ejects the object to be deployed to an outside of the container,
wherein the object to be deployed is the parachute according to claim 6.

9. The parachute according to claim 6, wherein an area ratio between the first member and the second member is 10 to 30(%):70 to 90(%).

10. The parachute according to claim 9, wherein an angle of the intersection where the center line coincides with an extending direction of the warp thread or the weft thread is 0°, an angle of the intersection in the impact buffer is 30° to 60°.

11. A safety device comprising:
a container including an opening;
an object to be deployed contained in the container; and an ejection device that is provided in the container and ejects the object to be deployed to an outside of the container, wherein the object to be deployed is the parachute according to claim 9.

12. A safety device comprising:

a container including an opening;

an object to be deployed contained in the container; and an ejection device that is provided in the container and ejects the object to be deployed to an outside of the container, wherein the object to be deployed is the parachute according to claim 1.

13. A flight vehicle comprising:

an airframe;

the safety device according to claim 12, the safety device being provided in the airframe; and one or more propulsion mechanisms coupled to the airframe to propel the airframe.

14. The safety device according to claim 12, wherein the ejection device is a pull-out ejection device that pulls out the parachute connected to another ejection object to an outside of the container by first ejecting the another ejection object and ejects the parachute.

15. The safety device according to claim 14, wherein a pilot chute having a configuration same as the parachute according to is connected to the parachute, and the ejection device ejects the pilot chute to pull out the parachute from the container.

16. The safety device according to claim 12, wherein the safety device is attachable to a flight vehicle, and further comprises an abnormality detection device capable of detecting an abnormality of the flight vehicle or a surrounding environment, and the abnormality detection device starts the ejection device in a case of detecting the abnormality.

17. The safety device according to claim 16, further comprising a flight control unit that stops a propulsion device provided in the flight vehicle in a case where the abnormality detection device detects the abnormality.

18. The safety device according to claim 16, wherein the ejection device is a pull-out ejection device that pulls out the parachute connected to another ejection object to an outside of the container by first ejecting the another ejection object and ejects the parachute.

* * * * *